Feb. 12, 1952 — E. BARANY — 2,585,725
CLUTCH DEVICE
Filed June 15, 1949 — 2 SHEETS—SHEET 1

INVENTOR.
Edmund Barany

Feb. 12, 1952 E. BARANY 2,585,725
CLUTCH DEVICE
Filed June 15, 1949 2 SHEETS—SHEET 2

INVENTOR.
Edmund Barany
BY
Att'ys

Patented Feb. 12, 1952

2,585,725

UNITED STATES PATENT OFFICE 2,585,725

CLUTCH DEVICE

Edmund Barany, Chicago, Ill., assignor to Ampro Corporation, Chicago, Ill., a corporation of Illinois Application June 15, 1949, Serial No. 99,140

11 Claims. (Cl. 192—54)

This invention relates to clutches, especially of the type wherein one of a pair of coaxial driving and driven elements is movable axially toward and away from the other to engage and release the clutch.

In certain fields of use, especially in light mechanisms that perform periodic operations, it is desirable to arrange a clutch for manual engagement to establish a drive to a load, to maintain the clutch engaged so long as drive of the load continues, and to disengage the clutch upon termination of load drive. Termination of a load drive may be by either completion of the operation or by interruption of supply of power to the clutch.

A typical use for such a clutch is in the rewind mechanism of motion picture projectors. The rewind operation conveniently and usually is performed by disabling the power drive to the takeup reel, which rotates the reel during projection to wind the used film thereon, and establishing a drive to the supply reel to rotate it and thereby rewind on it the film previously withdrawn during projection. For completely convenient operation, the rewind drive to the supply reel should be subject to manual establishment and once established should continue until the rewinding operation is either completed by emptying of the takeup reel or by interruption of the power driving the supply reel. In either event it is desirable that the rewind drive be interrupted automatically, to preclude accidental application of rewinding force during a following projection operation, when the operator may overlook necessity for disengaging a rewind drive requiring manual disabling.

The invention hereinafter described provides clutch mechanism having the desirable operation characteristics above noted, and particularly suited to such service as in rewind mechanism of motion picture projectors. United States Patent No. 1,912,153 issued May 30, 1933, to Axel A. Monson and Abram Shapiro discloses a somewhat similar clutch arrangement, and the present invention in certain respects constitutes improvement in that structure.

A primary object of the invention is the provision of a clutch assembly of elements relatively axially movable between engaging and released positions, with means automatically effective upon axial movement of the elements to engaged position, and when a load is being driven by the clutch, to lock the elements against axial movement to release position, and also automatically effective upon termination of load drive to release the elements from locked relation and to disengage them.

Another object is the provision in rewind mechanism of a motion picture projector of a clutch arrangement that is manually engageable to establish rewind drive, that will maintain the rewind drive until rewinding is completed or until the power is interrupted, and that will automatically disengage upon occurrence of either such event.

Still another object is the provision of a novel combined driven clutch and pulley member that is highly resistant to wear effect of a spiral spring type belt.

Figure 1:
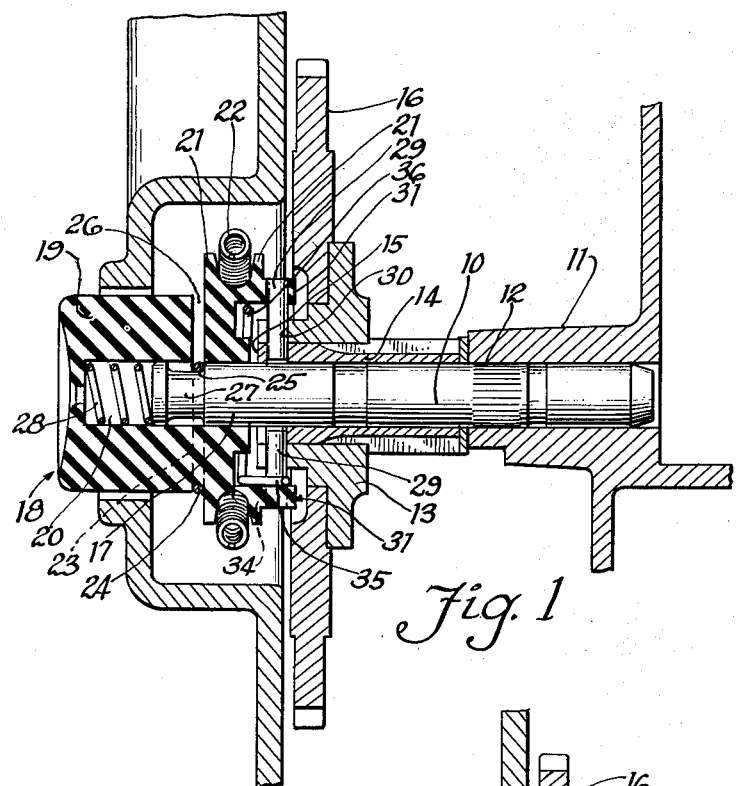
Fig. 1 is a median section through a motion picture rewind drive assembly including a clutch assembly of a driving element and a combined member comprising a driven clutch element and pulley, embodying one form of the invention, and shown in engaged condition.
Figure 2:
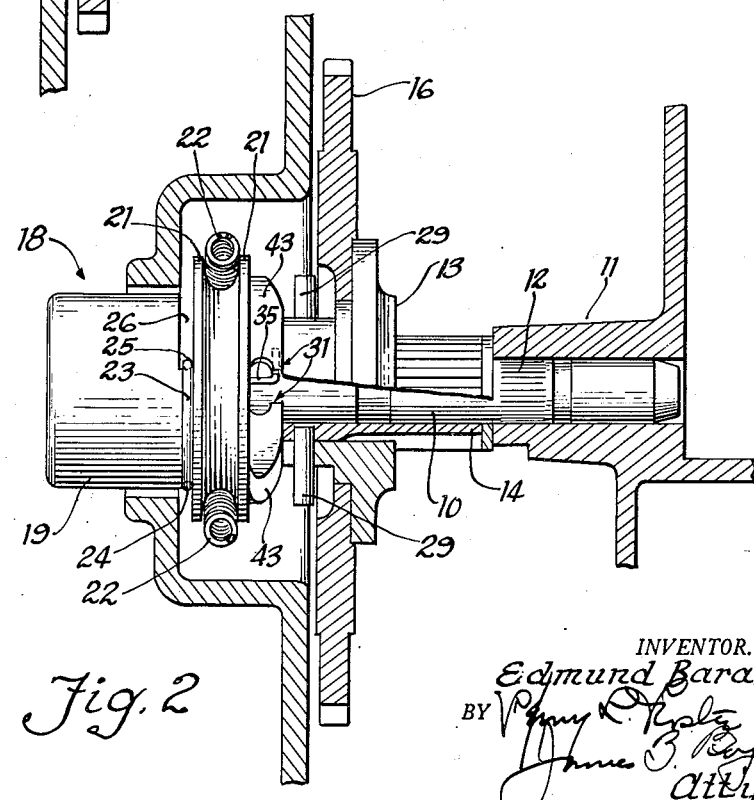
Fig. 2 is a partial section, showing the assembly of Fig. 1 in elevation, and in disengaged condition.

Describing the drawings in detail and first referring to Figs. 1 and 2, which disclose a clutch assembly for controlling rewind of a motion picture projector, a stud shaft 10 is supported in a horizontal position projecting from a frame part 11 wherein its end is shown secured by a press fitting at 12. A driving clutch element comprises a body 13 mounted upon and for coaxial rotation relative to shaft 10, to be driven by a gear wheel 16 secured to the body in spaced relation to such end surface.

A portion 17 of the shaft 10 projects axially beyond the inner surface 15 of the driving element, and supports rotatably thereon a driven clutch element 18. Such element 18 comprises a generally cylindrical body 19 mounted for rotation and axial sliding upon shaft portion 17 by a coaxial bore 20. The body 19 is provided with parallel circumferential flanges 21 that define between them a pulley channel for reception of a belt 22 to be driven by the clutch assembly when its driven and driving elements are in clutching relation. The driven element 18 may be secured on the shaft by means that permit its rotation and axial sliding between its engaged and released positions, such means being shown as a spring clip 23 having an arcuate part 24 seated in a groove surrounding the body and a straight part 25 extending through a slot 26 in the body, such part lying in a space surrounding an intermediate reduced portion 27 of the shaft. A spring 28 may be interposed between the end of the shaft and the inner end of the bore 20 to urge the driven element 18 axially outward toward a non-driving position remote from the driving element.

One of the clutch elements, here shown as the driving element 13 has a pair of diametrically opposite pins 29 having inner portions secured in radial bores 30 in the body and bushing and outer portions projecting radially beyond the surface of the driving element body. These pins are spaced a small distance inward from the end surface 15 of the body. The structure so far described is substantially like the clutch arrangement disclosed by the above-noted patent. In its intended operation, the clutch is in released condition and the belt 22 is not driven so long as the driven element 18 remains in its axially outer position shown in Fig. 2. Upon axial inward movement of the driven element 18 it engages the driving element, and it and the belt are driven. The following described structure is arranged to maintain the clutch elements engaged in driving condition so long as a load is driven by the belt, and to release the clutch when drive of such a load is terminated.

For engagement with the pins 29 that are mounted upon the one clutch element, both to rotate the driven element from the driving element, and to interlock the driven and driving elements to prevent axial movement by the former to its non-driving relation with the driving element, the other element, herein the driven element 18 carries a pair of hooks 31. These hooks 31 project axially from the end of the element on which they are mounted in the direction of the pin-carrying element. In the illustrated arrangement, the hooks are radially spaced from the axis of rotation by such distances as to lie outside the circumference of the end surface 15 of the driving element for cooperation with the radially projecting parts of its pins 29. Each hook comprises an axially projecting part or shank 32 and an end part 33 that extends from the shank angularly to the rear, with respect to the predetermined direction of rotation, overlying a recess 34 that is open toward the rear, to receive one of the pins 29 when the driving element rotates relative to the driven element in the predetermined direction, and when the driven element has been axially moved to its inner position. When the pins 29 have so entered the recesses 34 it will be evident that the elements are locked together against relative axial movement, and against relative rotation so long as the driving element is being rotated in the predetermined direction.

In operation of the mechanism so far described, assuming the driving element 13 to be rotating in the predetermined direction and that a rewind operation is to be performed, manual movement inward of the driven element 18 by pushing on its outer end surface, brings the hooks into such relation to the pins 29 that the latter enter the recesses 34 as the driving element rotates relative to the driven element. Contact of the pins with the hook shanks 32 establishes a rotative driving connection from driving to driven element, and the end parts 33 of the hooks prevent outward axial movement of the element 18 to disengage the clutch by overlying the pins.

To automatically disengage the clutch upon termination of load drive, as by either completion of the rewinding operation or by interruption of the power drive to the driving element 13, an arrangement is provided for exerting between the elements, when the pins and hooks are engaged, a force tending to relatively rotate them in a direction to move the pins out of the hook recesses 34. Such arrangement may be as follows: A pin-contacting element 35 is located relative to the open side of one of the hook recesses 34, to be contacted by a pin 29 as it moves toward engagement in that recess. The element 35 is so arranged that it yieldingly resists entrance of the pin into the recess, but that such resistance is overcome by the turning force exerted upon it by the driving element acting against the resistance of a load driven by the belt 24. The pin thus is permitted to enter the recess by moving the element 35, the latter constantly exerts against the pin a force that tends to urge the pin out of the recess, thereby also tending to rotate the driving element rearwardly and the driven element forwardly, with respect to the predetermined direction of rotation. Thus upon termination of the load drive, the torque of which serves to maintain the pins 29 in the recesses against the force exerted by the member 35, such force becomes effective to relatively rotate the clutch elements and release engagement of the pins and hooks, thereby permitting axial outward movement of the driven element to its released condition.

Obviously, arrangement of the element 35 to perform its intended function may be accomplished in a great many ways. In the arrangement of Figs. 1 to 4 the element 35 comprises the offbent end portion of a spring wire 36, best shown in Fig. 3. Such spring has one end 37 looped and secured against the end surface of the driven element body, at a point spaced both radially and angularly from the hook with which the device cooperates. The reach of the spring between its ends extends along and close to the body surface in generally arcuate fashion about the bore 20 and axis of rotation of the body, and the offbent portion that constitutes the element 35 extends axially of the body, across the path of the pin into the recess. Upon approach of the pin to engagement in the recess, it first contacts the part 35 and its continued movement into the recess tenses the spring, and so the latter exerts on the pin the force that tends to move the pin from the recess.

Figure 3:
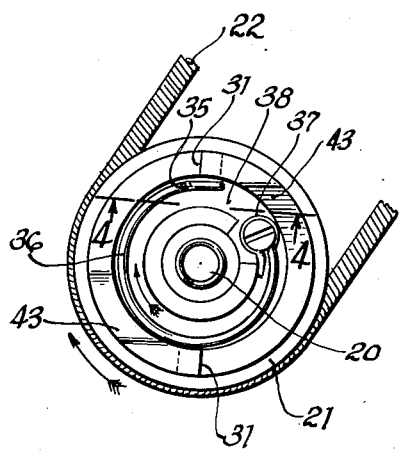
Fig. 3 is an end elevation of a preferred form of the combined driven element and pulley member of Fig. 1.
Figure 5:
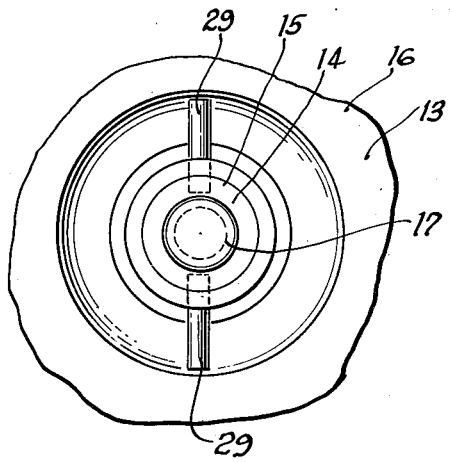
Fig. 5 is an end elevation of a cooperating driving clutch element.
Figure 4:
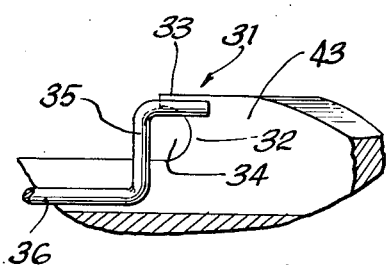
Fig. 4 is a section on line 4—4 of Fig. 3.

As shown in Figs. 1, 3 and 4 the end part of the driven clutch body 19 may be provided with a channel 38 within which the spring 36 may be located, to avoid possibility of its contact with the end of the driving element. Various configurations of end surface of body 19 may be employed, as may various spring devices, it being preferable that any such spring device be located inwardly of the outermost end surface, to be guarded from contact by the driving element, except as interlocking engagement occurs between the elements.

Figure 6:
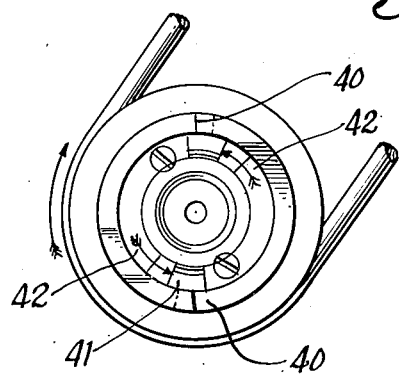
Fig. 6 is an end elevation of a modified form of driven clutch element.

Fig. 6 discloses a modified form of the invention. In this arrangement there is associated with each hook 40 a pin-contacting member 41 slidably secured to the body of the driven element for arcuate movement in a path extending from the rear of the hook recesses, with respect to predetermined drive direction, to the innermost margin of such recesses. These pin-contacting members are urged in the direction counter to that of drive rotation, or outward of the recesses by suitable spring arrangements enclosed by the body, as diagrammatically indicated by the arrows 42.

The hooks 31 of Figs. 1 to 4, and 40 of Fig. 6, may be formed by flanges 43 extending along arcs centered in the axis of rotation of the driven element 18, and projecting axially from the inner end of such element. Preferably the end surfaces of these flanges follow curved inclines, the height of the flanges from the end surface of the driven element body increasing toward the hooks in the reverse direction to that of predetermined rotation. These inclined surfaces act as guides, cooperating with the pins upon rotation of the driving element relative to the driven element, as the latter is moved inwardly toward the driving element, to guide the pins to the recess openings.

As suggested by the cross hatching of Fig. 1, the driven element body 19, and especially the parts of the body forming the pulley channel 23, are made of a molded artificial plastic. It is a well known characteristic of such soft metal as brass, of which such pulley elements commonly have been made, to be subject to rapid wear by the resilient coil spring belts widely used in amateur motion picture apparatus, particularly the belt driving pulley of the high speed rewind apparatus. It has been found that whereas wear on a brass rewind belt driven clutch and pulley element during a continuous run of five hours at normal rewind speed, amounted to eighty-seven thousandths of an inch, wear on a combined clutch and pulley made of molded artificial plastic, during a continuous run of forty hours at the same rewind speed, amounted to only two one thousandths of an inch. Therefore, it is evident that such material has an unexpected very valuable resistance to wear by a coil spring belt driven at high speed by a pulley element of such material.

It will be apparent that the valuable characteristics and advantageous features of the herein described invention may be obtained by many specific arrangements other than the detailed structures disclosed. Accordingly, scope of protection to be afforded the invention is to be determined by the appended claims, rather than by the foregoing descriptions.

I claim:

1. In a clutch assembly that includes coaxial driving and driven elements arranged for relative axial movement between driving and released conditions one of said elements carrying a radially projecting pin; a hook carried by the other element extending axially in the direction of the pin-carrying element and arranged for interlocking engagement with the pin by relative rotation of the two elements when in the driving condition to prevent their relative axial movement, and spring means mounted on one said element and arranged to be tensed during interlocking engagement of said pin and hook to exert between said elements a force tending to rotate them relatively in a direction to disengage the hook and pin, and to be cleared by the other said element when said elements are in their released condition.

2. In a clutch assembly that includes coaxial driving and driven elements arranged for relative axial movement between driving and released conditions, one of said elements carrying a radially projecting pin; a hook carried by the other element extending axially in the direction of the pin-carrying element and arranged for interlocking engagement with the pin by relative rotation of the two elements when in their driving condition to prevent their relative axial movement, spring means mounted upon one said element, and cooperative means carried by the other element arranged to contact and tense said spring means during engagement of the hook and pin, thereby to exert a force tending to relatively rotate said elements to disengage the hook and pin.

3. In a clutch assembly that includes coaxial driving and driven elements arranged for relative axial movement between driving and released conditions, and wherein one said element carries a radially projecting pin; a hook carried by the other element extending in the direction of the pin-carrying element and arranged for interlocking engagement with the pin by relative rotation of the two elements when in their driving condition to prevent their relative axial movement, and resilient means carried by the hook-carrying element and arranged thereon relative to the hook for contact and tensing by said pin during engagement of the hook and pin, thereby to exert a force tending to relatively rotate said elements to disengage the hook and pin.

4. In a clutch assembly that includes coaxial driving and driven elements arranged for relative axial movement between driving and released conditions, and wherein one of said elements carries a radially projecting pin, a hook carried by the other element in radially spaced relation to the axis, extending axially in the direction of the pin-carrying element, having a recess arranged for reception of the pin and for interlocking engagement with the pin upon relative rotation of the elements when in their driving condition and a spring secured to the hook-carrying element, said spring having a part extending into the path of entry of the pin into said recess for contact by the pin and tensing of the spring during such entry.

5. In a clutch assembly that includes coaxial driving and driven elements arranged for relative axial movement between driving and released conditions and wherein one of said elements carries a radially projecting pin; an end surface on the other element, a hook carried by said other element radially spaced from the axis and projecting beyond said end surface in the direction of the pin-carrying element, and including a portion overlying a recess arranged to receive said pin in interlocking engagement upon relative rotation of the two elements when in their driving condition and a generally arcuate spring having one end secured to said end surface and its other end arranged relative to said recess for contact by the pin and tensing of the spring during entry of the pin into the recess.

6. A clutch assembly including a driving element for rotation in a predetermined direction, a driven element for driving a load having a torque requirement greater than a predetermined minimum, said driven element being disposed coaxial with the driving element and said elements being arranged for relative axial movement between driving and released condition, interlocking members comprising a radially projecting pin carried by one said element, a hook carried by the other said element, projecting axially in the direction of the pin-carrying element, and arranged to engage said pin upon rotation of the driving element in the predetermined direction and to secure said elements against axial relative movement when so engaged, a member projecting from one element axially in the direction of the other element and having a lateral surface, and spring means carried by the other element arranged to be contacted and tensed by said projecting surface during relative rotation of the members to engage said pin and hook, said spring means having a characteristic permitting such engagement during drive of a load having the predetermined torque requirement, to prevent such engagement when such a load is not being driven, and to terminate such engagement by relatively rotating said elements upon termination of drive of such a load.

7. In a clutch assembly that includes coaxial driving and driven elements for rotation in a predetermined direction and arranged for relative axial movement between remote and adjacent relative positions, and wherein said elements respectively are provided with radially disposed surfaces arranged for driving contact upon rotation of the driving element relative to the driven element, in the predetermined direction and when the elements are in their adjacent relative positions; cooperative means carried by said elements arranged to engage as said surfaces approach contact and to maintain said elements in their adjacent relative positions when so engaged, and resilient means arranged to become effective as said cooperative means engage to exert between the elements a force resisting their relative rotation toward contact of said surfaces, of a magnitude to be overcome by torque exerted between the driving member and a load on the driven member and sufficient to relatively rotate the elements to disengage said cooperative means in the absence of such a torque.

8. A clutch element comprising a body for clutching engagement with a cooperative element carrying a radially projecting pin by relative movement of such element from remote to adjacent positions, said clutch element comprising, a body arranged to be mounted for rotation in a predetermined direction and having an end surface for disposition transverse to its axis of rotation and toward such other element, a hook projecting from said body axially beyond said end surface and defining a laterally open recess for engagement with the radially projecting pin of said cooperative element when in adjacent positions, and a spring mounted upon said body and having a portion disposed radially adjacent said opening for contact and movement by said cooperative element-carried pin moving rotatively relative to said member and toward engagement in said recess, said spring being arranged to be tensed by such movement of said spring portion.

9. A driven clutch element according to claim 8, wherein said surface comprises an end surface of the body and is concentric relative to the axis of rotation, and said spring is generally arcuate and is extended from its said portion at least partially about the axis of rotation.

10. A driven clutch element according to claim 8, wherein said surface is concentric relative to the axis of rotation, the spring comprises a resilient wire having one of its ends secured against said surface at a location spaced from the hook and the spring portion disposed adjacent the hook comprises the other end of said wire bent to extend across said recess adjacent its open side.

11. A driven clutch element according to claim 8, wherein said surface comprises an end surface of the body and is concentric relative to the axis of rotation, the spring comprises a resilient wire having one end secured against said surface at a location spaced angularly and radially from the hook, an intermediate reach extending along said surface from such securing location to a point adjacent the hook and said spring portion adjacent the hook comprises an end part of said wire extending at an angle to said intermediate reach and substantially axially of said body.

EDMUND BARANY.

REFERENCES CITED

The following references are of record in the file of this patent:

UNITED STATES PATENTS

| Number | Name | Date |
| --- | --- | --- |
| 273,544 | Irvine | Mar. 6, 1883 |
| 1,371,512 | Nickerson | Mar. 15, 1921 |
| 2,060,175 | Carleton | Nov. 10, 1936 |
| 2,233,539 | Landrum | Mar. 4, 1941 |
| 2,354,805 | Fey | Aug. 1, 1944 |